US000001106H

United States Statutory Invention Registration [19]

[11] Reg. Number: H1106

Tachibana et al.

[43] Published: Sep. 1, 1992

[54] MULTI-LAYER SILVER HALIDE PHOTOGRAPHIC ELEMENT

[76] Inventors: Noriki Tachibana; Masato Nishizeki; Nobuaki Kagawa, all of c/o Konica Corporation No. 1, Sakura-machi, Hino-shi, Tokyo 191, Japan

[21] Appl. No.: 749,465

[22] Filed: Aug. 15, 1991

Related U.S. Application Data

[63] Continuation of Ser. No. 403,093, Sep. 5, 1989, abandoned.

[30] Foreign Application Priority Data

Sep. 5, 1988 [JP] Japan ..... 63-220552

[51] Int. Cl.[5] ..... G03C 1/76

[52] U.S. Cl. ..... 430/537; 430/523; 430/531; 430/537

[58] Field of Search ..... 430/525, 527, 531, 537

[56] References Cited

U.S. PATENT DOCUMENTS

| | | | |
|---|---|---|---|
| 2,423,549 | 7/1947 | Blake et al. | 95/7 |
| 2,436,138 | 2/1948 | Cairns et al. | 95/7 |
| 3,178,296 | 4/1965 | Minsk | 96/114 |
| 3,284,207 | 11/1966 | Stonham | 430/627 |
| 3,957,492 | 5/1976 | Miyazako et al. | 430/627 |
| 4,323,644 | 4/1982 | Nakamura et al. | 430/627 |
| 4,350,759 | 9/1982 | Fitzgerald et al. | 430/627 |
| 4,362,812 | 12/1982 | Mimamizono et al. | 430/627 |
| 4,431,730 | 2/1984 | Urabe et al. | 430/627 |
| 4,710,456 | 12/1987 | Noai et al. | 430/564 |
| 4,916,053 | 4/1990 | Ohshima et al. | 430/526 |

FOREIGN PATENT DOCUMENTS 0121141 10/1984 European Pat. Off. .

OTHER PUBLICATIONS

G. F. Van Veelen et al., "Physical and photographic properties of polyethylene oxides", Sep./Oct. 1967, pp. 226–235, The Journal of Photographic Science, London, GB; *p. 228, section 2.5*.

*Primary Examiner*—Robert L. Stoll
*Assistant Examiner*—Joseph D. Anthony

[57] ABSTRACT

A silver halide photographic material having a polymer with a cloud point incorporated in at least one layer on a support.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTI-LAYER SILVER HALIDE PHOTOGRAPHIC ELEMENT

This application is a continuation of application Ser. No. 07/403,093, filed Sept. 5, 1989, abandoned.

BACKGROUND OF THE INVENTION

The present invention relates to a photographic material which is more adapted for rapid processing than conventional product without sacrificing photographic characteristics.

Hydrophilic colloidal films used to prepare photographic materials are required not to cause any adverse effects on their photographic characteristics. Further, they are required to have certain strength as an important physical property. Since photographic materials are prepared by coating supports with hydrophilic colloidal layers including silver halide emulsion layers, intermediate layers and protective layers, various attempts have been made to improve the physical properties, such as dimensional stability, scratch resistance, softness, pressure resistance and drying property, of the resulting hydrophilic colloidal films by incorporating into them water-soluble polymers or polymer latices made through polymerization of various monomers.

Along with this line, various approaches have been proposed. For example, JP-A-61-69061 and JP-A-61-15127 (the term "JP-A" as used herein means an "unexamined published Japanese patent application") teach the use of acrylamide derivatives; U.S. Pat. No. 2,376,005 shows the use of polymer latices of vinyl acetate; U.S. Pat. No. 3,325,286 proposes the use of polymer latices of alkyl acrylates; JP-B-45-5331 (the term "JP-B" as used herein mean an "examined Japanese patent publication") teaches the use of polymer latices of such monomers as n-butyl acrylate, ethyl acrylate, styrene, butadiene, vinyl acetate and acrylonitrile; JP-B-46-22506 shows the use of polymer latices of such monomers as alkyl acrylates, acrylic acid and sulfoalkyl acrylates; and JP-A-51-130217 proposes the use of a polymer latex of 2-acrylamido-2-methylpropanesulfonic acid.

A recent tendency in the photographic industry is to process photographic materials with greater rapidity and this has necessitated more stringent requirements for the physical properties of hydrophilic colloidal films. Rapid processing can mainly be accomplished by shortening the durations of development and drying steps. The drying time could be shortened by reducing the content of binders in hydrophilic colloidal films but binders will cause adverse effects on the film strength, thus limiting the effectiveness of reducing the binder content. On the other hand, the drying time can hardly be shortened even if the polymers or polymer latices proposed by the prior art are used as binders. Therefore, none of the binders so far used have been capable of reducing the duration of drying step which follows development although they impart reasonable strength to hydrophilic colloidal films.

SUMMARY OF THE INVENTION

The principal object of the present invention is to provide a silver halide photographic material that has satisfactory film strength and which yet is adapted for rapid processing through shortening of the drying time.

This object of the present invention is attained by a silver halide photographic material having a polymer with a cloud point incorporated in at least one layer on a support. In other words, the duration of drying step which follows development can be shortened by incorporating a polymer with a cloud point in at least one photographic layer.

DETAILED DESCRIPTION OF THE INVENTION

The polymer to be used in the present invention to attain its objective preferably has a cloud point of no higher than about 80° C., with the range of 20°-80° C. being more preferred. A particularly preferred range is from 20° to 70° C.

Polymers having a cloud point that are to be used in the present invention may be exemplified by polymers which have a recurring unit represented by the following general formula (I):

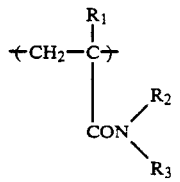

(I)

where $R_1$ is a hydrogen atom or an alkyl group having 1-6 carbon atoms; $R_2$ and $R_3$ which may be the same or different are each a hydrogen atom, an alkyl group having 1-10 carbon atoms, an aryl group or an aralkyl group, provided that $R_2$ and $R_3$ are not a hydrogen atom at the same time and that they may combine with each other to form a nitrogenous hereto ring together with the nitrogen atom.

Preferably, $R_2$ or $R_3$ is such alkyl group that the sum of their carbon atoms is not smaller than 3.

Preferred examples of monomers that make recurring units represented by the general formula (I) are listed below specifically:

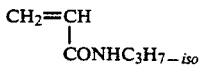

M-1

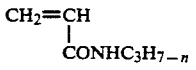

M-2

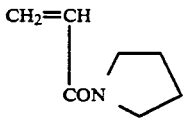

M-3

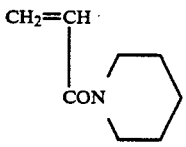

M-4

In order to provide effective polymers, the recurring unit represented by the general formula (I) may comprise two or more monomer units.

The polymers to be used in the present invention preferably contain at least 10%, more preferably at least 99%, of the recurring units represented by the general formula (I), and may be exemplified by polymers represented by the following general formula (II):

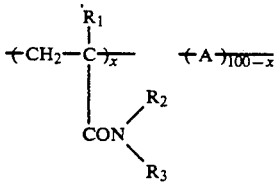

(II)

where X ranges from 100 to 10 mol %, and A represents a copolymerizable recurring unit, provided that A may comprise two or more monomer units. If A has a cross-linking group, the resulting polymer does not have a clearly defined cloud point but in this case, the content of recurring units represented by the general formula (I) should be at least 50 mol %.

Examples of A that are preferably used in the present invention are listed below:

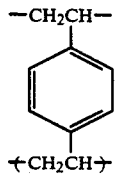

A-1

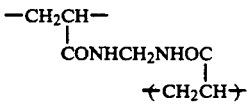

A-2

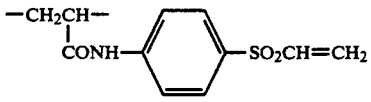

A-3

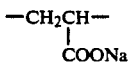

A-4

Examples of polymers that are preferably used in the present invention are listed below:

| | | |
|---|---|---|
| P-1 | 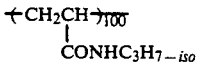 | c.p. (cloud point) 30° C. |
| P-2 | 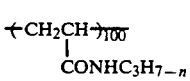 | c.p. 20° C. |
| P-3 | 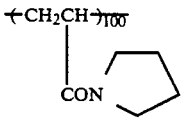 | c.p. 50° C. |
| P-4 | 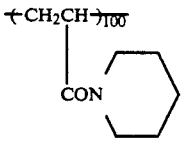 | c.p. 5° C. |
| P-5 | 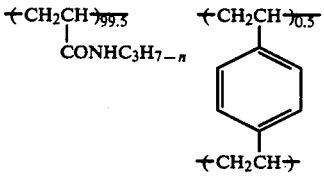 | c.p. 20° C. |
| P-6 | 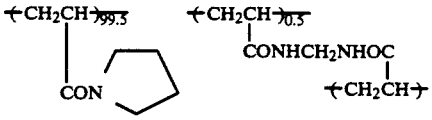 | c.p. 50° C. |
| P-7 | 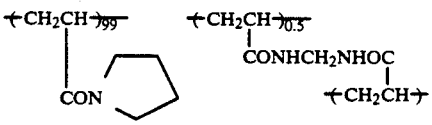 | c.p. 50° C. |

-continued

| | | |
|---|---|---|
| P-8 | 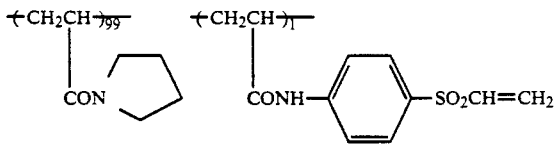 | c.p. 50° C. |
| P-9 | 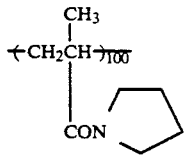 | c.p. 60° C. |
| P-10 | 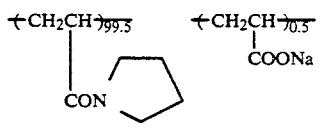 | c.p. 50° C. |

The cloud points noted above are the temperatures at which 10 wt % aqueous solutions of the polymers listed above begin to cloud.

The polymers with a cloud point which are to be used in the present invention preferably have molecular weights (mw) in the range of 3,000–500,000. These polymers may be added in any suitable amounts but preferably they are used in amounts accounting for 5–50 wt % of the total coontent of binders, with the range of 10–30 wt % being particularly preferred.

The polymers of the present invention may be used in every kind of hydrophilic colloidal layers in silver halide photographic materials, such as silver halide emulsion layers, intermediate layers, protective layers, antihalation layers, back coatings and subbing layers.

In the present invention gelatin is advantageously used as a hydrophilic colloid together with the polymers described above, but other hydrophilic colloids may also be used and they include gelatin derivatives, grafted polymers of gelatin with other polymers, other proteins, saccharide derivatives, cellulose derivatives, and synthetic hydrophilic high-molecular weight materials such as homo- and copolymers.

Useful examples of gelatin include lime-processed gelatin, acid-processed gelatin, and enzyme-processed gelatin of the type described in Bull. Soc. Sci, Phot. Japan, No. 16, p. 30, 1966. Also useful are gelatin hydrolyzate and the enzymatic decomposition products of gelatin.

Examples of gelatin derivatives that can be used include those which are obtained by reacting gelatin with various compounds such as acid halides, acid anhydrides, isocyanates, bromoacetic acid, alkane sultones, vinyl sulfonamides, maleinimide compounds, polyalkylene oxides and epoxy compounds. Specific examples of such gelatin derivatives are described in patents including U.S. Pat. Nos. 2,614,928, 3,132,945, 3,186,846, 3,312,553, British Patent Nos. 861,414, 1,033,189, 1,005,784, and JP-B-42-26845.

Preferred examples of other proteins include albumin and casein. Preferred examples of cellulose derivatives include hydroxyethyl cellulose, carboxymethyl cellulose and sulfate esters of cellulose. Preferred examples of saccharide derivatives include sodium alginate and starch derivatives.

Examples of the graft polymers of gelatin with other polymers include those which have homo- or copolymers of vinyl monomers such as acrylic acid, methacrylic acid, derivatives thereof such as esters and amides, as well as acrylonitrile and styrene grafted onto gelatin. Particularly preferred are graft polymers of gelatin with polymers which are miscible with gelatin to some extent, such as polymers of acrylic acid, acrylamide, methacrylamide, hydroxyalkyl metharylates, etc. Specific examples of these are described in U.S. Pat. Nos. 2,763,625, 2,831,767 and 2,956,884.

Typical synthetic hydrophilic high-molecular weight materials include homo- and copolymers such as polyvinyl alcohol, partially acetalized polyvinyl alcohol, poly-N-vinylpyrrolidone, polyacrylic acid, polymethacrylic acid, polyacrylamide, polyvinyl imidazole and polyvinyl pyrazole. Examples of such synthetic hydrophilic high-molecular weight materials are described in West German Patent Application (OLS) No. 2,315,708, U.S. Pat. Nos. 3,620,751 and 3,879,205, and JP-B-43-7561. These polymers are preferably incorporated in smaller amounts than the polymers of the present invention.

We now describe the particles to be used in the light-sensitive silver halide emulsion layers of the silver halide photographic material of the present invention. The particle size distribution of useful particles may be such that they are monodispersed. "Monodispersed" particles are such dispersion systems that 95% of the particles present are within ±60%, preferably ±40%, of the number average particle size. The term "number average particle size" means the number average of the diameters of circles equivalent to the projected areas of silver halide grains of interest.

In one example, the emulsion may be such that at least 50% of the total projected area of the grains is assumed by superflat silver halide grains the diameter of which is at least five times the thickness. For further details, see JP-A-58-127921 and 58-113927.

The silver halide grains preferably incorporated in light-sensitive silver halide emulsion layers according to the present invention are such that at least 80% in either weight or number of the particles assume a regular structure or form. The term "silver halide grains assuming a regular structure or form" means particles that do not involve any anisotropic growth as twin planes and all of which will grow isotropically as in the forms of a cube, tetrahedron, ootahedron, duodecahedron and a sphere. Such regular silver halide grains can be produced by processes such as those described in J. Phot. Sci., 5, 332 (1961), Ber. Bunsenges. Phys. Chem., 67, 949 (1963), and Intern. Congress Phot. Sci., Tokyo (1967). In producing monodispersed emulsions and/or emulsions having regular silver halide grains, reference should preferably be made to JP-B-48-36890, 52-16364, and JP-A-55-142329.

In the practice of the present invention, silver halide grains to be used in light-sensitive silver halide emulsion layers may be prepared by suitable methods such as those described in T. H. James, "The Theory of the Photographic Process", 4th Ed., Macmillan Publishing Company, 1977, P. Glafkides, "Chimie et Physique Photographique", Paul Montel, 1967, G. F. Duffin, "Photographic Emulsion Chemistry", The Focal Press, 1966, and V. L. Zelikman et al., "Making and Coating Photographic Emulsions, The Focal Press, 1964.

In forming silver halide grains, silver halide solvents may be used to control their growth, and exemplary silver halide solvents include ammonia, potassium thiocyanate, ammonium thiocyanate, thioether compounds (e.g. those which are described in U.S. Pat. Nos. 3,271,157, 3,574,628, 3,704,130, 4,297,439 and 4,276,374), thione compounds (e.g. those described in JP-A-53-144319, 53-82408 and 55-77737), and amine compounds (e.g. those described in JP-A-54-100717). Ammonia is particularly preferred.

Two or more silver halide emulsions may be used as admixtures after they have been formed separately.

The silver halide grains or silver halide emulsions described above may contain at least one salt (soluble salt) of a metal selected from among iridium, thallium, palladium, rhodium, zinc, nickel, cobalt, uranium, thorium, strontium, tungsten and platinum. Such metal salts are preferably incorporated in amounts ranging from $10^{-6}$ to $10^{-1}$ mole per mole of pAg. It is particularly preferred for at least one of thallium, palladiuim and iridium salts to be incorporated in silver halide grains or silver halide emulsions. These salts may be used either on their own or as admixture, with the timing of their addition being properly selected. The use of these metal salts is anticipated to bring about various advantages such as improvement in flash exposure characteristics, prevention of pressure desensitization, prevention of latent-image fading, and effective sensitization.

A preferred embodiment of the practice of the present invention is such that the mother liquor containing protective colloids has a pAg of 10.5 or more at least during the growth of grains before chemical sensitization. In a particularly preferred embodiment, the growing grains are at least once passed through an atmosphere with great excess of bromide ions ($pAg \geqq 11.5$). This is effective in producing round grains with an increased number of (111) faces. Such (111) faces preferably account for at least 5% of the total surface area of the grains. The increase in the number of (111) faces (as compared to the number before passage through the atmosphere having a pAg of at least 10.5) is preferably at least 10%, more preferably in the range of 10–20%.

For the method of determining which of the (111) face or (100) face cover the outer surfaces of silver halide grains or as for the method of measuring the proportions of these two faces, see the description in A. Hirata, Bulletin of the Society of Scientific Photography of Japan, No. 13, pp. 5–15 (1963).

The time at which an atmosphere having a pAg of at least 10.5 is created is desirably after the addition of about two thirds of the total silver to be added has been completed but before the desalting step is started. By selecting this timing, a monodispersed emulsion having a narrow grain size distribution can be obtained with ease. Ripening in the atmosphere having a pAg or 10.5 or more is preferably continued for at least minutes.

In the present invention, the light-sensitive silver halide emulsion layer may contain silver halide grains that have a multilayered structure.

Grains having a multilayered structure are such that one or more coating layers having a desired halide composition area provided on the outside of the internal core. The number of coating layers is not limited but it is preferably no greater than 5.

The silver halide of which the internal core and the coating layers are made is silver bromide, silver iodobromide or silver iodide but it may be a mixture with a minor amount of silver chloride. Stated specifically, it may contain no more than about 10 mol %, preferably no more than about 5 mol %, of silver chloride.

The outermost layer is substantially made of silver bromide or silver iodobromide (with no more than 10 mol % of iodine) and may contain less than a few mol % of chlorine atoms.

In some photographic materials, typically exemplified by X-ray photographic materials, silver iodide may aggravate the problem of development restrainment or infectious development and its content is preferably limited below a certain level in practical applications. The silver iodide content is preferably no more than 10 mol %, more preferably 7 mol % or less, of all the grains of interest, with the range of 0.1–3 mol % being most preferred.

If the internal core is made of silver iodobromide, it is preferably a homogeneous solid solution phase. The term "homogeneous" as used here may be specifically explained as follows: in powder X-ray diffractiometry of silver halide grains with CuK$\beta$ X rays, the half-peak value ($\Delta\ 2\theta$) for the Miller indices of (200) face of silver iodobromide is 0.03 degrees or less. The diffractometer is used in such a way as to satisfy the condition $\omega\gamma/r \leqq 10$, where $\omega$ (deg/min) is the scanning speed of goniometer, $\gamma$ (sec) is the time constant, and r (mm) is the width of receiving slit.

The halide composition of the internal core is such that the average iodine content is preferably no more than 40 mol %, more preferably in the range of 0–20 mol %.

Any two adjacent layers (i.e., two coating layers or the internal core and the overlying layer) preferably have a difference of at least 10 mol %, more preferably at least 20 mol %, in the silver iodine content, with the value of at least 25 mol % being particularly preferred.

Coating layers other than the outermost one preferably have a silver iodide content of 10–100 mol %.

When silver halide grains are composed of three or more layers, with the coating layers being made of silver iodobromide, not all of the constituent layers need be homogeneous. However, it is preferred that all layers are made of homogeneous silver iodobromide.

Coating layers (or the internal core) having high silver iodide content are preferably situated below the outermost layer in the case of a negative-working silver halide emulsion. In the case of a positive-working emulsion, such coating layers of high AgI content may be located either within or on the surface of grains. The outermost coating layer preferably has a silver iodide content of 10 mol % or less, 0–5 mol % being more preferred.

The silver iodide content of the internal core and coating layers of the silver halide grains that are to be used in the light-sensitive silver halide emulsions of the present invention can be measured by the method described in J. T. Goldstein and D. B. Williams, "X-Ray Analysis in TEM/ATEM", Scanning Electron Microscopy, IIT Research Institute, vol. 1, p. 651, Mar. 1977.

When the silver halide grains in the light-sensitive silver halide emulsion layer of the present invention are composed of two layers, the internal core preferably has a higher iodine content than the outermost layer. In the case of three-layered grains, coating layers other than the outermost one or the internal core preferably has a higher iodine content than the outermost layer.

The silver halide grains in the light-sensitive silver halide emulsion layers of the present invention may be of a positive- or negative-working type.

For chemical sensitization, the methods described in Die Grund-lagen der Photographischen Prozesse mit Silverhalogeniden, ed. by H. Frieser, Akademische Verlagsgesellschaft, pp. 675–734, 1968.

Spectral sensitizers may be added at a desired time between the formation of silver halide grains and the chemical ripening or coating step. Such spectral sensitizers are preferably added after the time when 60–100% of the final volume of silver halide grains to be formed have been formed and before the time when chemical ripening is completed.

Specific examples of spectral sensitizers that can be used are described in various references such as: P. Glafkides, Chimie Photographique, 2nd Ed., Chapters 35–41, Paul Montel, Paris, 1957; P. M. Hamer, The Cyanine and Related Compounds, Interscience; U.S. Pat. Nos. 2,503,776, 3,459,553 and 3,177,210; and Research Disclosure, vol. 176, No. 19643, under J or Section 23-IV, December 1978.

Spectral sensitizers may be used either on their own or as admixtures.

If spectral sensitizers are to be used in the present invention, their concentrations may be the same as those employed in ordinary negative-working silver halide emulsions. It is particularly advantageous to use spectral sensitizers at concentrations that will not cause a substantial decrease in the intrinsic sensitivity of the silver halide emulsion. Special sensitizers are preferably used at concentrations of ca. $1.0\times10^{-5}$ to $5.0\times10^{-4}$ moles, more preferably ca. $4.0\times10^{-5}$ to $2.0\times10^{-4}$ moles, per mole of silver halide.

In addition to spectral sensitizers, dyes that do not have their own ability to perform spectral sensitization or materials that are substantially incapable of absorbing visible light and which provide supersensitization may be incorporated in the emulsion. For instance, aminostilbene compounds having a nitrogenous heterocyclic group as a substituent (e.g. those described in U.S. Pat. Nos. 2,933,390 and 3,635,721), the products of condensation between aromatic organic acids and formaldehyde (e.g. those described in U.S. Pat. No. 3,743,510), cadmium salts, azaindene compounds, etc. may be incorporated in the emulsion.

Besides the additives described above, the silver halide photographic material of the present invention may contain various other additives that are useful in photographic materials, such as matting agents, stabilizers, development accelerators, hardeners, surfactants, antistain agents, lubricants, uv absorbers, formaldehyde scavengers, color couplers, antistats, etc.

Photographic emulsion layers and other constituent layers in the silver halide photographic material of the present invention are coated on one or both sides of flexible supports that are commonly employed in photographic materials.

Supports that can be used in the present invention include: flexible reflective supports such as paper laminated with α-olefinic polymers (e.g. polyethylene, polypropylene and ethylene/butene copolymer) and synthetic paper; films made of semisynthetic or synthetic polymers such as cellulose acetate, cellulose nitrate, polystyrene, polyvinyl chloride, polyethylene terephthalate, polycarbonate and polyamide; flexible supports having a reflective layer formed on these films; glass; metals; and ceramics. These supports may be tinted with dyes or pigments. The surface of these supports is usually subbed in order to provide good adhesion to photographic emulsion layers and other constituent layers. The surface of the supports may be subjected to a preliminary treatment such as corona discharge, uv irradiation or flame treatment prior to subbing. For detailed information on supports, see under "Supports" on page 25 of Research Disclosure, vol. 176.

Examples of the silver halide photographic materials to which the present invention maybe applied include black-and-white light-sensitive materials such as those used as camera materials, in X-ray photography and in printing, as well as multilayered color light-sensitive materials such as color reversal films, color negative films and color positive films.

The silver halide photographic material of the present invention may be processed by various methods using various processing solutions as described in Research Disclosure No. 176, pp. 25–30 (RD-17,643). Depending on its object, the processing may be black-and-white photography for forming a silver image or color photography for forming a dye image.

The processing temperature is normally selected from the range of 18°–50° C. but it may be lower than 18° C. or higher than 50° C.

The processing temperature and time are interrelated and determined by the relationship with the total processing time.

Other processing methods such as thermal development may of course be employed depending on the case.

Developers to be used in black-and-white photography may incorporate known developing agents. Applicable developing agents include dihydroxybenzenes (e.g. hydroquinone), 3-pyrazolidones (e.g. 1-phenyl-3-pyrazolidone) and aminophenols (e.g. N-methyl-p-aminophenol) and these may be used either on their own or as admixtures.

Developers usually contain various other additives such as preservatives, alkali agents, pH buffers and antifoggants. If necessary, developers may also contain other additives such as dissolution aids, tone modifiers, development accelerators, surfactants, antifoaming agents, water softeners, hardeners and tackifiers.

In a special processing method, a developing agent may be incorporated in the light-sensitive material in a certain layer, for example, an emulsion layer, with the light-sensitive material being processed in an aqueous alkaline solution. Hydrophobic developing agents may be incorporated in emulsion layers by the methods described in such references as Research Disclosure No. 169 (RD-16928), U.S. Pat. No. 2,739,890, British Patent No. 813,253 and West German Patent No. 1,547,763. The processing described above may be combined with a silver salt stabilizing treatment which employs thiocyanates.

Color developers are usually composed of aqueous alkaline solutions containing color developing agents. Various primary aromatic amine compounds such as phenylenediamines may be used as color developing agents and they may be exemplified by 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfoamidoethylaniline, and 4-amino-3-methyl-N-ethyl-N-β-methoxyethylaniline.

Other applicable color developing agents are described in such references as L. F. A. Mason, "Photographic Processing Chemistry", pp. 226–229, The Focal Press, 1966, U.S. Pat. Nos. 2,193,015 and 2,592,364, and JP-A-48-64933.

Color developers may contain other additives such as pH buffers (e.g. sulfites, carbonates, borates and phosphates of alkali metals), development retarders (e.g. bromides and iodides) and antifoggants (e.g. organic antifoggants). If necessary, color developers may contain water softeners, preservatives (e.g. hydroxyamines), organic solvents (e.g. benzyl alcohol and diethylene glycol), development accelerators (polyethylene glycol, quaternary ammonium salts and amines), dye forming couplers, auxiliary developing agents (e.g. 1-phenyl-3-pyrazolidone), tackifiers, polycarboxylic acid based chelatants, and antioxidants.

After color development, photographic emulsion layers are usually subjected to bleaching, which may be effected either simultaneously with or separately from the fixing step. Applicable bleaching agents include compounds of polyvalent metals such as iron (III), cobalt (III), chromium (IV) and copper (II), peracids, quinones and nitroso compounds. More specific examples are ferricyanide compounds, bichromates, organic complex salts of iron (III) or cobalt (III) such as complex salts of organic acids (e.g. aminopolycarboxylic acids like ethylenediaminetetraacetic acid, nitrilotriacetic acid and 1,3-diamino-2-propanoltetraacetic acid, or citric acid, tartaric acid and malic acid), persulfates, permanganates and nitrosophenol. Among these compounds, potassium ferricyanide, ethylenediaminetetraacetic acid iron (III) sodium and ethylenediaminetetraacetic acid iron (III) ammonium are particularly useful. Complex salts of ethylenediaminetetraacetic acid are useful not only in independent bleaching solutions but also in monobath blix solutions.

Fixing solutions to be used may have ordinary compositions. Useful fixing agents include not only thiosulfates and thiocyanates but also organic sulfur compounds which are known to be effective as fixing agents. Fixing solutions may contain water-soluble aluminum salts as hardeners.

In the present invention, the developed and fixed photographic material is subsequently rinsed and dried. Rising is effected in order to remove almost all the silver salt that has been dissolved during the fixing step. Drying is performed at 40°–100° C., preferably at about 50° C. or above. The drying time which is adjustable in accordance with the environmental condition may normally last for about 5–25 seconds. In a typical case, satisfactory results can be attained by drying at an air flow rate of 6–14 $m^3$/min with a heater capacity of 2.0–40 kW (200 V).

The following example is provided for the purpose of further illustrating the present invention but is in no way to be taken as limiting.

EXAMPLE 1

To a silver iodobromide gelatin emulsion (3 mol % AgI), 4-hydroxy-6-methyl-1,3,3a,7-tetraazaindene and 2,4-dichloro-6-hydroxy-s-triazine were added. The so treated AgIBr emulsion was applied to a subbed polyethylene terephthalate support to give a silver deposit of 50 mg/$dm^2$. A protective layer was then formed by applying 50 mg/$m^2$ of polymethyl methacrylate particles (0.5 μm in size), 5 mg/$m^2$ of $C_8F_{17}SO_3Na$, 5 mg of

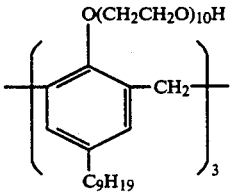

and 1.0 g/$m^2$ of gelatin. The thus prepared sample was used as a reference and designated EO.

Samples E1 to E4 were prepared in the same way except that the polymers indicated in Table 1 (see below) were added in an amount of 10 wt % of the gelatin in the emulsion. Comparative samples A and B were also prepared using polymer latex A [containing a recurring unit represented by

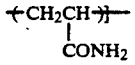

and polymer latex B [containing a recurring unit represented by

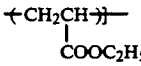

The respective samples were exposed through an optical wedge and processed by the scheme shown below (for the drying temperatures employed, see Table 1). After drying, the samples were evaluated for the change in weight (degree of drying), scratch resistance, devitrification and photographic characteristics. The results are shown in Table 1.

| Processing scheme | Temperature (°C.) | Time (second) |
|---|---|---|
| Steps | | |
| Development | 30 | 45 |
| Fixing | 25 | 35 |
| Rinsing | 15 | 35 |
| Drying | | 20 |
| Developer's recipe | | |
| Phenidone | 0.4 g | |
| Metol | 5 g | |
| Hydroquinone | 1 g | |
| Anhydrous sodium sulfite | 60 g | |
| Sodium carbonate.$H_2O$ | 54 g | |
| 5-Nitroimidazole | 100 mg | |
| Potassium bromide | 2.5 g | |
| Water | to make 1,000 ml | |

-continued

| Processing scheme | Temperature (°C.) | Time (second) |
|---|---|---|
| pH | adjusted to 10.20 | |

The degree of drying (weight change), scratch resistance, devitrification and sensitivity were evaluated by the following methods.

Degree of drying (weight change)

A sample having a width of 35 mm and a length of 1,000 mm was evaluated for the degree of drying by the equation $100 \times W_2/W_1$ (where $W_1$ (g): the sample weight before development, and $W_2$ (g): the sample weight after drying).

Scratch resistance

After development, fixing and rinsing were performed according to the scheme shown above, the film surface of the sample which was immersed in the rinse water was scratched with a weight metal stylus (0.5 mil$^{\Phi}$) and the minimum weight that caused damage to the sample was read to evaluate its scratch resistance.

Devitrification

Sample's resistance to devitrification was visually checked by the following criteria: A, no loss of transparency after processing; B, the sample turned milky white to a very slight extent; and C, the sample turned milky white to a slight extent. Devitrification is a measure of polymer's miscibility with gelatin.

Sensitivity

Sensitivity measurements were conducted with a sensitometer Model KS-1 of Konica Corp. Sensitivity is expressed as the reciprocal of the exposure necessary to provide a concentration of fog+0.7 and data is shown in Table 1 in terms of relative values, with the sensitivity of reference sample EO being taken as 100.

TABLE 1

| Sample | Polymer | Scratch resistance (g) | $W_2/W_1$ 40° C. | $W_2/W_1$ 50° C. | Devitrification | Photographic characteristics: Specific sensitivity | Photographic characteristics: fog |
|---|---|---|---|---|---|---|---|
| E0 | — | 47 | 150 | 120 | A | 100 | 0.06 |
| E1 | P-1 (c.p.30° C.) | 60 | 108 | 103 | A | 100 | 0.07 |
| E2 | P-3 (c.p.50° C.) | 62 | 108 | 103 | A | 100 | 0.06 |
| E3 | P-6 (c.p.50° C.) | 67 | 105 | 101 | A | 100 | 0.06 |
| E4 | P-10 (c.p.50° C.) | 62 | 110 | 104 | A | 99 | 0.07 |
| Comparative sample | A | 59 | 130 | 120 | B | 100 | 0.07 |
| Comparative sample | B | 53 | 125 | 115 | C | 97 | 0.08 |

The samples of the present invention were satisfactory in all aspects, degree of drying, scratch resistance, devitrification and photographic characteristics.

The present invention provides silver halide photographic materials that have reasonably high film strength and which yet are adapted for rapid processing.

What is claimed is:

1. In a silver halide photographic element having a support and a plurality of hydrophilic colloidal layers on the support including a silver halide emulsion layer, the improvement wherein a binder being contained in one of said hydrophilic colloidal layers comprises a gelatin emulsion, the improvement comprising a polymer selected from the group consisting of compounds P-3, P-6 and P-10 as follows:

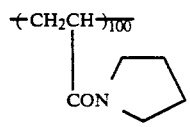

P-3

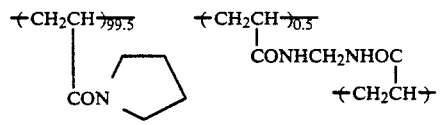

P-6

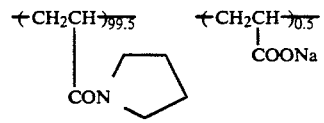

P-10 contained in said gelatin emulsion in an amount of 10 wt % of the total content of said gelatin binder.

* * * * *